(12) United States Patent
Bunnow et al.

(10) Patent No.: US 6,793,293 B2
(45) Date of Patent: Sep. 21, 2004

(54) WHEEL ASSEMBLY FOR A WORK MACHINE AND APPARATUS FOR RETAINING WHEEL STUDS

(75) Inventors: Marcus D. Bunnow, Decatur, IL (US); Keith A. Kabrick, Springfield, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/245,612

(22) Filed: Sep. 17, 2002

(65) Prior Publication Data

US 2004/0051372 A1 Mar. 18, 2004

(51) Int. Cl.[7] ................................................. B66B 23/06
(52) U.S. Cl. ................................. 301/11.1; 301/35.621; 301/35.624; 301/105.1
(58) Field of Search .............................. 301/10.1, 11.1, 301/12.1, 11.2, 23, 26, 27, 35.621, 35.623, 35.625, 35.632, 105.1, 111.1, 112, 114, 35.624

(56) References Cited

U.S. PATENT DOCUMENTS

| | | | | |
|---|---|---|---|---|
| 1,588,669 A | * | 6/1926 | Forsyth | |
| 1,652,433 A | * | 12/1927 | Forsyth | |
| 1,974,746 A | * | 9/1934 | Huhnen | |
| 2,877,054 A | * | 3/1959 | Hedlund et al. | |
| 4,371,212 A | * | 2/1983 | Rohr | 301/10.1 |

FOREIGN PATENT DOCUMENTS

CH      474379     * 8/1969

* cited by examiner

*Primary Examiner*—Russell D. Stormer
(74) *Attorney, Agent, or Firm*—Thomas L. Derry; W. Bryan Mcpherson, III

(57) ABSTRACT

The present invention provides a wheel assembly for a work machine, the wheel assembly includes a hub defined about a central axis. The hub includes an inboard end, an outboard end and a rim-mounting flange. The rim-mounting flange includes an inboard surface, and outboard surface and an outer edge defined there between. The outer edge includes a groove extending toward the hub. A plurality of bores are disposed about the rim-mounting flange, each of the bores defines a bore diameter. A stud, having a shoulder defining a shoulder diameter is positioned in each of the bores. A retainer is positioned in the groove and holds each stud in its respective bore.

17 Claims, 3 Drawing Sheets

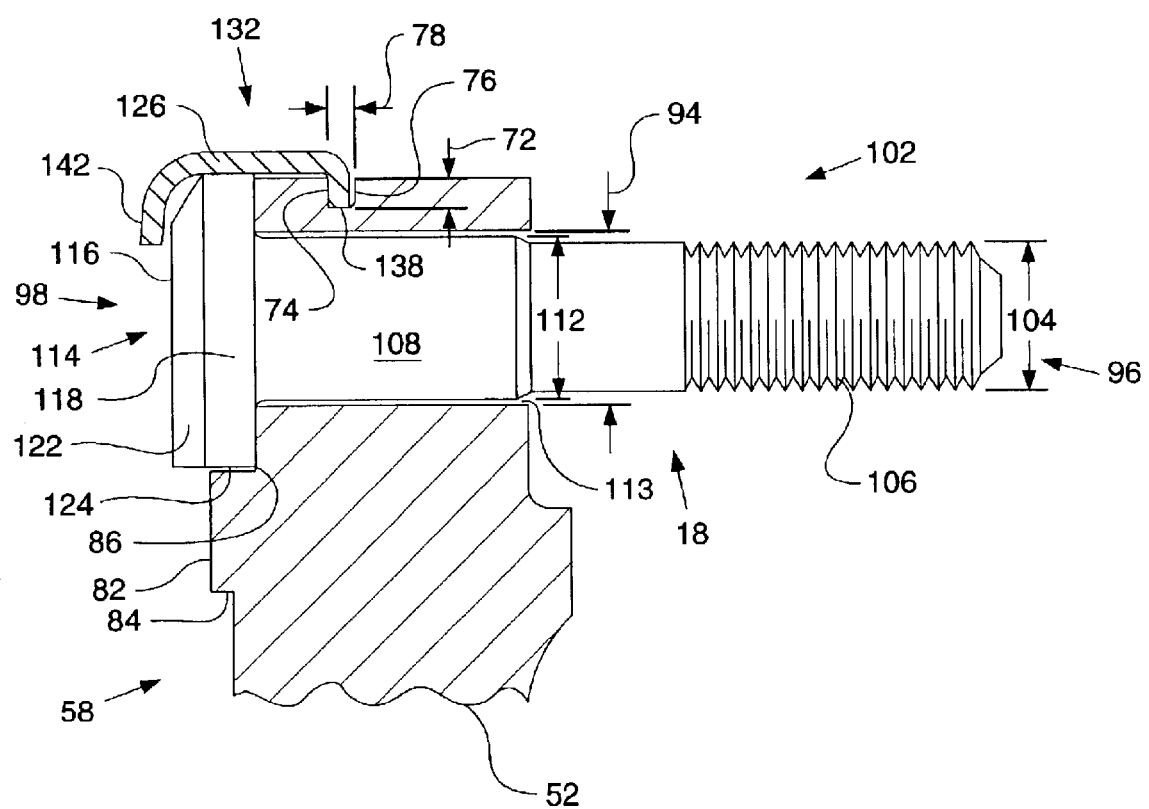
Fig_2_

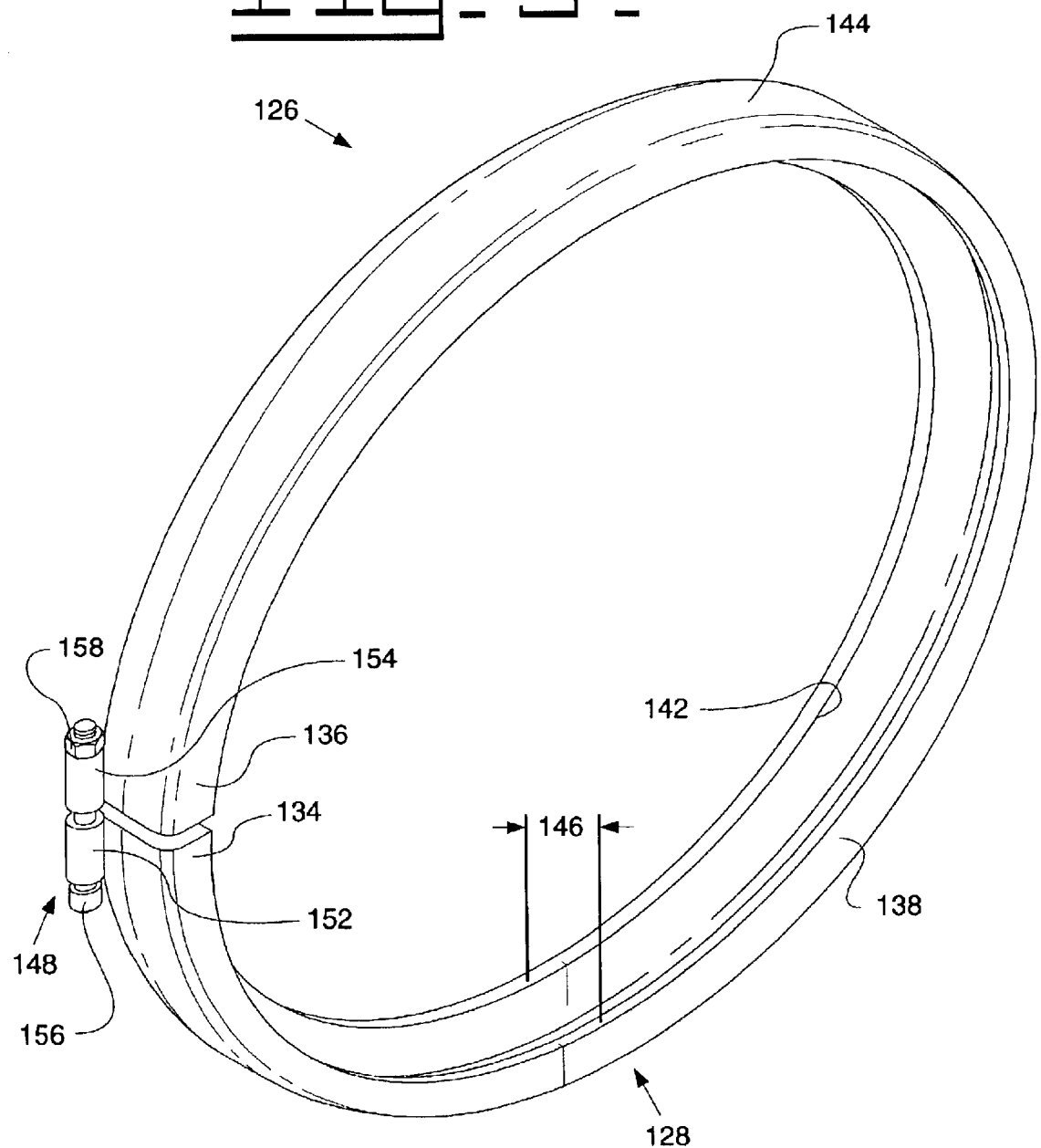

US 6,793,293 B2

WHEEL ASSEMBLY FOR A WORK MACHINE AND APPARATUS FOR RETAINING WHEEL STUDS

TECHNICAL FIELD

This invention relates generally to a wheel assembly used to move a work machine about the ground and more specifically to an apparatus for retaining a wheel stud in the wheel.

BACKGROUND

Wheel assemblies of work machines typically use a plurality of wheel studs for securing a rim and tire to the wheel. The wheel includes a central hub and a rim-mounting flange extending radially outward from the hub. The hub is configured to receive a pair of tapered roller bearings that rotatably mount to an axle or spindle. The wheel studs are positioned in a pattern of bores, evenly disposed around the flange. The wheel studs typically include a threaded portion, a head portion and a serrated shoulder portion. The shoulder portion is configured to engage one of the bores, creating an interference fit and preventing the studs from being pushed out of the bores as the rim is positioned over the studs.

Large work machines, such as mining trucks, include extremely large tire and rim assemblies, in many cases the rim and tire assemblies are in excess of ten feet tall and weigh thousands of pounds. These large tires must be handled by forklifts that have been specially adapted for changing the large tires. During installation of the rim and tire on the wheel, it is difficult to align the rim with the studs. As the tire and rim is moved toward the studs, the studs sometimes get pushed out of the bore. Repeated installation and removal of the stud may damage the bore, as the serrations of the stud abrade on the bore.

The studs may also become damaged during transportation of the machine from the manufacturer to the work site. The size of the machines requires that they be shipped with the tires and rims removed from the machine. The wheel studs are often unprotected, causing rust or other damage. Additionally, the machines typically are operated in environments that induce rust and damage to the threads. This damage requires replacement of the stud, beginning the wear cycle on the bore.

Once a bore has become damaged it must be repaired to reestablish the press fit. Repairing the bore of a steel wheel requires building up the damaged area by welding and then machining the bore to the proper size. This welding and machining is costly. The true expense of this repair is further increased by the cost of the machine being out of service. Wheels manufactured from a ductile iron cannot be welded properly and often must be replaced.

The present invention is directed to overcoming one or more of the above problems.

SUMMARY OF THE INVENTION

In one aspect of the invention, a rotatable wheel having outboard end and an inboard end the wheel including a rim-mounting flange having an inboard surface, an outboard surface extending outward from the hub. The rim-mounting flange includes a plurality of bores extending through the rim-mounting flange. Each bore defines a bore diameter. A wheel stud disposed in each of the bores. The wheel stud has a shoulder defining a shoulder diameter. The bore diameter is larger than the shoulder diameter. A retainer is attached to the wheel and engages at least one wheel stud, preventing the stud from being removed from its respective bore.

BRIEF DESCRIPTION OF THE DRAWINGS

FIG. 2 is a fragmentary cross-sectional view of a wheel stud and retainer positioned in a wheel.

FIG. 3 is a perspective view of the stud retainer of the present invention.

DETAILED DESCRIPTION

Figure 1:
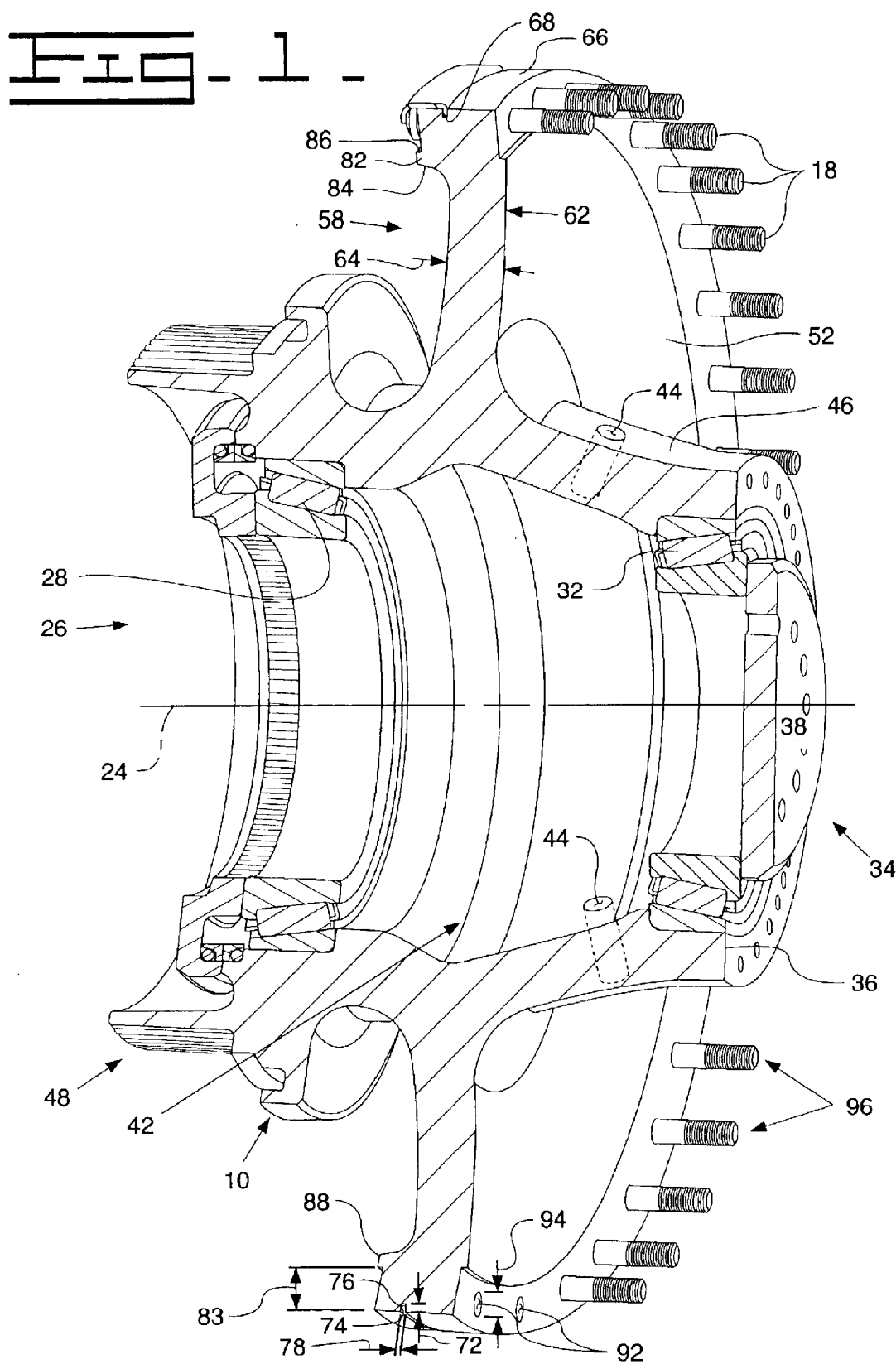
FIG. 1 is a perspective sectional view of a wheel assembly incorporating the present invention.

FIG. 1 illustrates a wheel 10 for use on a work machine. A brake assembly (not shown) of conventional design may be positioned between the wheel 10 and a spindle (not shown). The brake assembly would act to resist rotation of the wheel 10 on the spindle, when the brake is applied. It should be noted that the wheel 10 employing the present invention would also function with a typical drive axle arrangement (not shown). A rim (not shown) is configured to be attached to the wheel 10 using a plurality of wheel studs 18 and lug nuts (not shown). The rim is adapted to receive a tire (not shown) in a conventional manner.

The wheel 10 is typically manufactured from a casting. The casting is machined to manufacturers specified dimensions using conventional machining techniques. The wheel 10 is defined about a central axis 24 that extends horizontally through the wheel 10. The wheel 10 includes a cylindrical hub 26 disposed about the central axis 24. The hub 26 is adapted to receive an inner bearing set 28 and an outer bearing set 32. The inner and outer bearing sets 28, 32 are adapted to rotatably engage the spindle or axle. The bearing cap 38 attaches to the spindle 12 and acts to preload the inner and outer bearings 28, 32. An additional cap (not shown) engages the outboard end 34 of the hub 26 and covers the bearing cap 38, creating an oil reservoir 42 within the hub 26. At least one threaded hole 44 extends from the reservoir 42 to an outer surface 46 of the hub 26. The threaded hole 44 provides a passage for filling the reservoir 42 with lubricating oil. An inboard end 48 of the wheel 10 is adapted to engage the brake assembly.

A rim-mounting flange 52 extends radially outwardly from the outer surface 46 of the hub 26. The rim-mounting flange 52 is interposed the inboard end 48 and an outboard end 34 of the hub 26. The rim-mounting flange 52 defines an inboard surface 58 and an outboard surface 62, spaced an axial distance 64 apart. An outer edge 66 is defined about the rim-mounting flange 52 adjoining the inboard surface 58 and the outboard surface 62. The outer edge 66 further includes a groove 68. The groove 68 extends inward toward the central axis 24 a predetermined depth 72. The groove 68 further defines an inboard wall 74 and an outboard wall 76. A width 78 is defined between the inboard wall 74 and the outboard wall 76. A raised portion 82 is disposed about the rim-mounting flange 52, and extends inwardly from the inboard surface 62. The raised portion 82 is coaxial with the central axis 24 of the hub 26. The raised portion 82 is located a distance 83 from outer edge 66 of the rim-mounting flange 52. The raised portion 62 has a first surface 84 that faces the hub 26, a second surface 86 facing away from the hub 26 and a third surface 88 joining the first and second surfaces 84,86.

A pattern of bores 92 is disposed about the rim-mounting flange 52. The bores 92 are radially spaced at a predetermined distance from the central axis of the hub 26. Each of the bores 92 extends from the inboard surface 58 through the rim-mounting flange 52, to the outboard surface 62. The each one of the bores 92 defines a bore diameter 94 and is adapted to receive one of the plurality of wheel studs 18.

Referring now to FIG. 2, the wheel studs 18 are cylindrical fasteners having a first end 96, a second end 98 and an outer surface 102 extending there between. The outer surface 102 defines a first diameter 104 and includes a threaded portion 106 that extends from the first end 96, toward the second end 98. A shoulder 108 is defined on the outer surface 102 between the threaded portion 106 and the second end 98. The shoulder 108 defines a shoulder diameter 112 that is larger than the first diameter 104. The shoulder diameter 112 is also slightly less than the bore diameter 94, thereby providing a slight gap 113 between the bore 92 and the shoulder 108. For example, for a stud 18 having a shoulder 108 with a shoulder diameter 112 of 27 (mm), the respective bore 92 should be in the range of 25–26 (mm). The shoulder 108 has a smooth surface, as opposed to having a typical serrated surface. The second end 98 of each stud 18 includes a head 114 defined thereon. The head 114 of each stud 18 is larger in diameter than each of the shoulder diameter 112 and the bore 92. The head 114 of the stud 18 includes a top surface 116 and an edge surface 118 adjacent to the top surface 116. A tapered surface 122 may be disposed between the top surface 116 and the edge surface 118. A flat portion 124 is defined on the edge surface 118. Each stud 18 is adapted to be inserted into one of the bores 92. Each stud 18 is positioned into its respective bore 92 with the flat portion 124 of the head 114 positioned adjacent to the second surface 86 of the raised portion 82. The engagement of the flat portion 124 with the second surface 86 prevents rotation of the stud 18 in its respective bore 92. The stud 18 is further inserted until the head 114 of the stud 18 contacts the inboard surface 58 of the rim-mounting flange 52. The threaded portion 106 of the stud 18 protrudes through the outboard surface 62 of the rim-mounting flange 52. A retainer 126 is provided to maintain the studs 18 in position within the bores 92.

The retainer 126 provides a stationary member positioned between the inboard end 48 of the hub 26 and the inboard surface 58 of the rim-mounting flange 52. The head 114 of the stud 18 is trapped between the retainer 126 and the inboard surface 58. In one embodiment the retainer 126 is a ring 128 having a generally "C" shaped cross section 132.

Referring now to FIG. 3, the ring 128 includes a first end 134 and a second end 136. The "C" shaped cross section 132 defines a first leg 138, a second leg 142 and an outer leg 144, connecting the first and second legs 138,142. The first leg 138 of the retainer 126 defines an attachment portion, configured to fit into the groove 68 of the rim-mounting flange 52. The second leg 142 defines an engagement portion and is spaced away from the first leg 138 a predetermined distance 146. Having the first leg 138 positioned in the groove 68, causes the second leg 142 to engage the heads 114, holding the studs 18 in position. A closing device 148 may be provided on the first and second ends 134,136 of the retainer 126. The closing device 148, as illustrated includes a first tube section 152 and a second tube section 154. The first and second tube sections 152,154 are attached to the first and second ends 134,136 respectively, of the retainer 126, preferably by welding. A bolt 156 is positioned through the first and second tube sections 152,154 and a locking nut 158 is threaded on to the bolt 156. Alternatively of the locking nut 158, the second tube section 154 may include an internal thread (not shown) to engage the bolt 156. By tightening the bolt 156 the retainer 126 is drawn tightly into the groove 68, thereby holding each wheel stud 18 into its respective bore 92.

Another alternative closing devices 148, may include a wire (not shown) being tied between the first and second ends 134,136 of the ring 128, or bolting the first and second ends 134,136 directly to the rim-mounting flange 52. Other alternatives of the closing device 148 may be used without deviating from the scope of the invention.

INDUSTRIAL APPLICABILITY

In operation the wheel 10 of the present invention is positioned on a spindle 12 or axle of the work machine 14. The pattern of bores 92 of the rim-mounting flange 52 is visually inspected for damage or build up of debris. The wheel studs 18 are positioned in the bores 92 with the threaded portion 106 extending outward from the rim-mounting flange 52. The retainer 126 is expanded by removing the closing device 148 and pulling the first and second ends 134,136 away from one and other. One of the first and second ends 134,136 is then positioned with the first leg 138 inserted into the groove 68 and the second leg 142 covering the nearest head 114. The retainer 126 can further be expanded and installed with the first leg 138 positioned in the groove, and the heads 114 of all of the studs 118 trapped between the second leg 142 of the retainer 126 and the inboard surface 58 of the rim-mounting flange 52. The first and second ends 138,142 are fastened together using the closing device 148.

A tire and rim 16 are picked up using a forklift. The rim 16 is maneuvered into position so a plurality of holes in the rim align with the wheel studs 18. As the rim 16 is aligned with the studs 18 the forklift moves the tire and rim toward the studs 18. Any misalignment of the rim and studs 18 applies a force, attempting to push the studs 18 out of the bores 92. The retainer opposes the force and holds the studs 18 in their respective bore 92 until holes in the rim 16 are properly aligned and receive the studs 18. The lug nuts 22 are next installed and tightened on each stud 18, thereby fastening the rim 16 to the wheel 10.

In the event that any of the studs 92 becomes damaged, the rim 16 is first removed from the wheel 10. After the rim has been removed the closing device 148 (if included) is released and the retainer 126 is expanded and removed from the groove 68. Any damaged stud 18 can now be easily removed and replaced. After all damaged studs 18 have been replaced, the retainer 126 and wheel 10 may be reinstalled.

What is claimed is:

1. A rotatable wheel defined about a central axis, the wheel having a hub disposed about the central axis and having an outboard end and an inboard end, said wheel comprising:

a rim-mounting flange extending radially outward from the hub said rim-mounting flange having an inboard surface, an outboard surface and an outer edge between said inboard and outboard surfaces;

a pattern of bores extending through the rim mounting flange each of said bores defining a bore diameter;

a retainer removably attached to said wheel and being configured to prevent said wheels from being removed from said bores, wherein said retainer includes a first end and a second end, and wherein said first end and said second end include a closing device configured to draw said first end and said second end toward each other; and a wheel stud disposed in each of said bores, said wheel stud having a shoulder defining a shoulder diameter, wherein said bore diameter is larger than said shoulder diameter.

2. The rotatable wheel of claim 1, wherein said retainer defines a substantially "C" shaped cross-section.

3. The rotatable wheel of claim 2, wherein said "C" shaped cross section includes a first leg configured to engage a groove defined in said outer edge of said rim-mounting flange and a second leg configured to cover at least a portion of a head disposed on each of said wheel studs.

4. The rotatable wheel of claim 1, wherein said closing device includes a threaded fastener attaching said first end of said retainer to said second end of said retainer.

5. The rotatable wheel of claim 1, wherein said closing device includes a wire attaching said first end of said retainer to said second end of said retainer.

6. The rotatable wheel of claim 1, wherein at least one of said first and second ends is bolted to said rim-mounting flange.

7. A retainer configured to maintain at least one of a plurality of wheel studs in at least one of a plurality of bores, the bores being disposed on a rim mounting flange of a rotatable wheel, and the wheel being adapted to move a work machine across the ground, said retainer comprising:
an attachment portion and an engagement portion, wherein said attachment portion is configured to attach said retainer to the wheel and said engagement portion is configured to engage a head of said stud, thereby preventing each of said studs from being removed from said respective bore, wherein said retainer includes a substantially "C" shaped cross section, said "C" shaped cross section including a first leg and a second leg being connected to one another by an outer leg.

8. The retainer of claim 7, wherein said retainer is a substantially circular ring.

9. The retainer of claim 8, wherein said ring includes a first end and a second end.

10. The retainer of claim 9, wherein said ring includes a closing device, said closing device being configured to maintain one of said first and second end in a predetermined position related to the other of said first and second end.

11. The retainer of claim 10, wherein said closing device is a threaded fastener.

12. The retainer of claim 10, wherein said closing device is a wire.

13. The retainer of claim 7, having a substantially "C" shaped cross section, said "C" shaped cross section including a first leg and a second leg being connected to one and other by an outer leg.

14. The retainer of claim 7, wherein one of said first and second legs is configured to be removably attached to said rim-mounting flange and the other of said first and second legs is configured to engage at least one of said plurality of studs.

15. A rotatable wheel defined about a central axis, the wheel having a hub disposed about the central axis and having an outboard end and an inboard end, said wheel comprising:

a rim-mounting flange extending radially outward from the hub said rim-mounting flange having an inboard surface, an outboard surface and an outer edge between said inboard and outboard surfaces;

a pattern of bores extending through the rim mounting flange of each of said bores defining a bore diameter;

a retainer removably attached to said wheel and being configured to prevent said wheel studs from being removed from said bores, where said retainer has a first leg configured to engage a groove defined in said rim-mounting flange and a second leg configured to cover at least a portion of a head disposed on each of said wheel studs; and, a wheel stud disposed in each of said bores, said wheel stud having a shoulder defining a shoulder diameter, wherein said bore diameter is larger than said shoulder diameter.

16. A retainer configured to maintain at least one of a plurality of wheel studs in at least one of a plurality of bores, the bores being disposed on a rim mounting flange of a rotatable wheel, and the wheel being adapted to move a work machine across the ground, said retainer comprising:
an attachment portion and an engagement portion, wherein said attachment portion is configured to engage a groove defined in the wheel and said engagement portion is configured to engage a head of said stud, thereby preventing each of said studs from being removed from said respective bore.

17. A method of replacing a stud in a wheel, the wheel having a hub and an outboard end and an inboard end, a rim-mounting flange extending radially outward from the hub, the rim-mounting flange having an inboard surface, an outboard surface and an outer edge between said inboard and outboard surfaces, a pattern of bores extending through the rim mounting flange, each of the bores defining a bore diameter, the wheel stud disposed in each of the bores, the wheel stud having a shoulder defining a shoulder diameter, wherein said bore diameter is larger than said shoulder diameter, and a retainer removably attached to the wheel and being configured to the wheel studs from being removed from the bores, the retainer having a first leg configured to engage a groove defined in the outer edge of the rim-mounting flange and a second leg configured to cover at least a portion of a head disposed in each of said wheel studs, comprising the steps of:
disengaging said retainer from said groove; and
removing said stud from said wheel in response to said retainer being disengaged.

* * * * *

UNITED STATES PATENT AND TRADEMARK OFFICE
CERTIFICATE OF CORRECTION

PATENT NO.    : 6,793,293 B2                                                     Page 1 of 1
DATED         : September 21, 2004
INVENTOR(S)   : Marcus D. Bunnow et al.

It is certified that error appears in the above-identified patent and that said Letters Patent is hereby corrected as shown below:

Column 5,
Line 43, delete Claim 13.

Signed and Sealed this

Sixteenth Day of August, 2005

JON W. DUDAS
*Director of the United States Patent and Trademark Office*